United States Patent Office 2,699,120
Patented Jan. 11, 1955

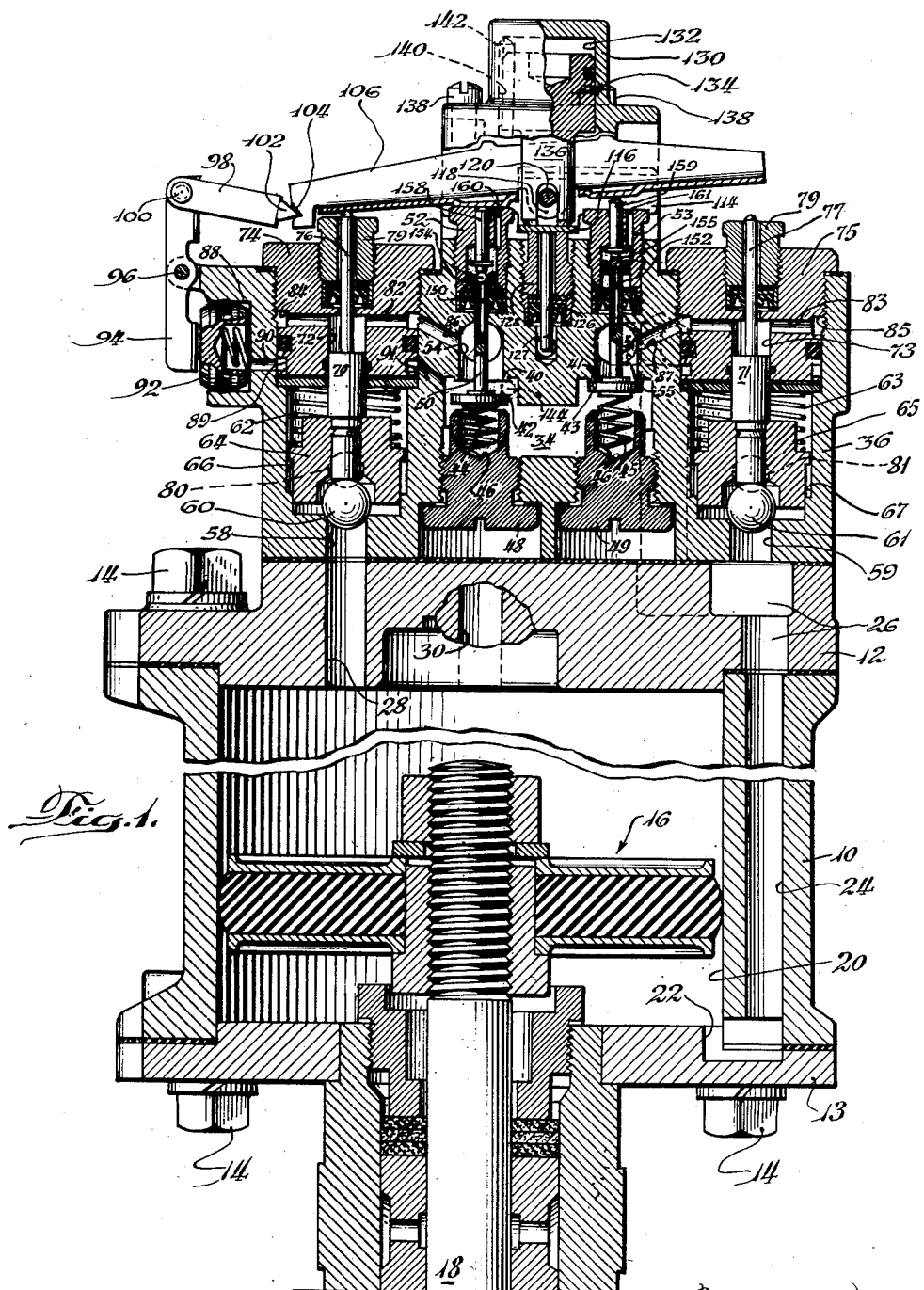

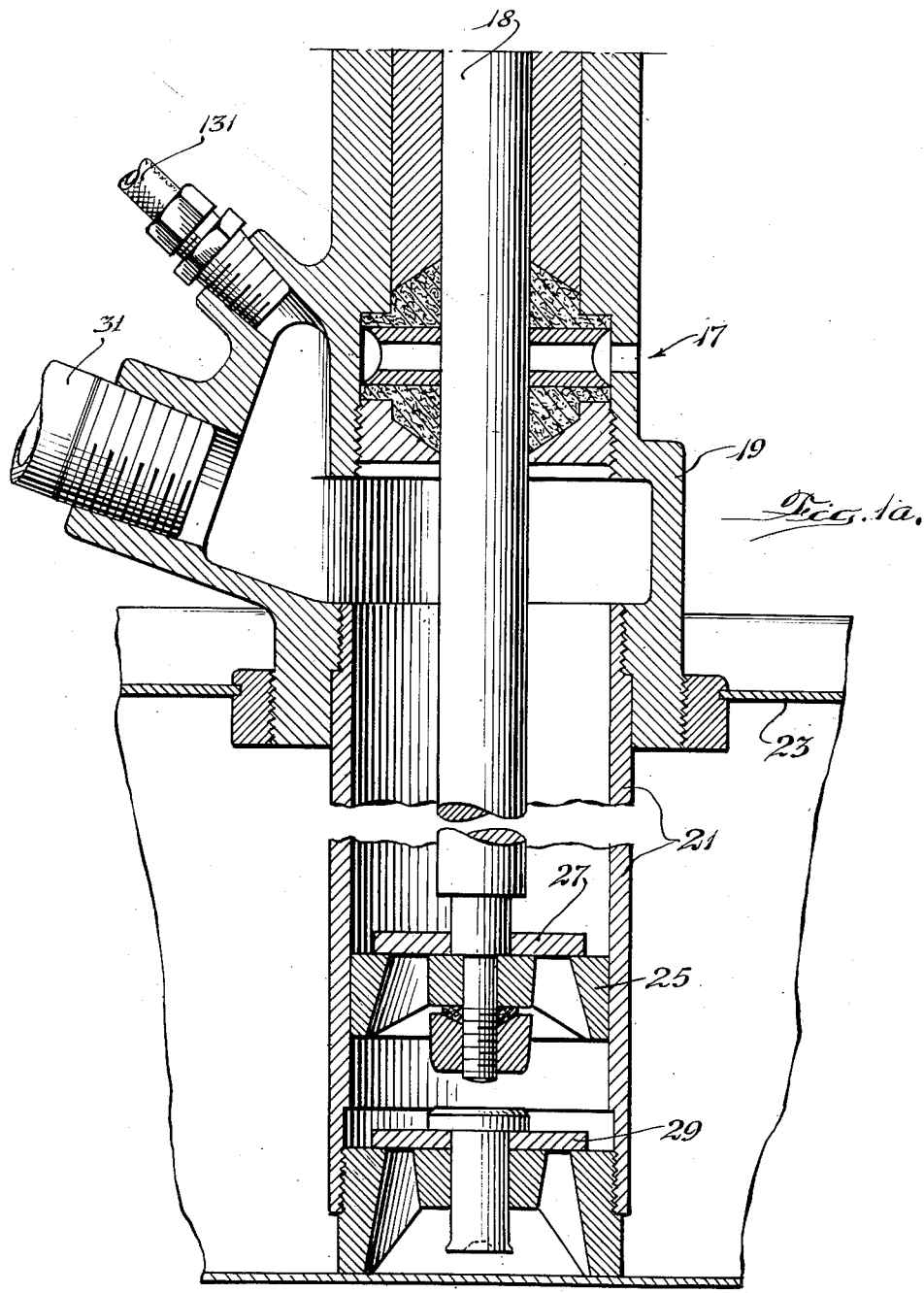

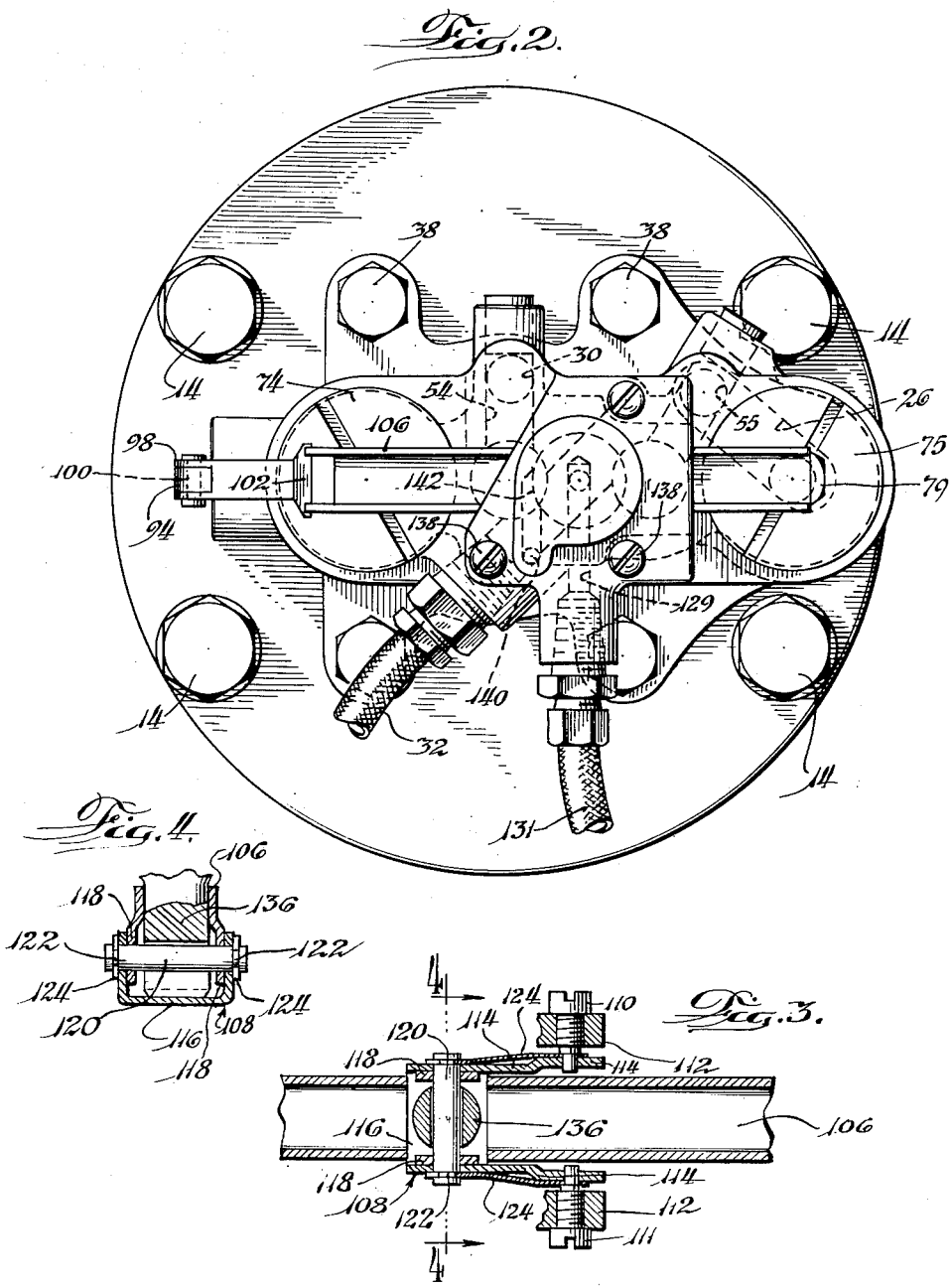

2,699,120

VALVE MECHANISM FOR RECIPROCATING FLUID OPERATED MOTORS

Frederick G. Schweisthal, Skokie, Ill., assignor to Stewart-Warner Corporation, Chicago, Ill., a corporation of Virginia Application May 26, 1950, Serial No. 164,359

10 Claims. (Cl. 103—48)

My invention relates generally to valve mechanisms for reciprocating fluid pressure operated motors, and more particularly to valve mechanisms for pneumatically operated reciprocating motors forming parts of lubricant pumps.

In lubricant pumps of the reciprocating type, operated by pneumatic motors, it is common practice to utilize a D-slide valve or other valve mechanism, alternately to connect the compressed air supply to the opposite ends of the motor cylinder, and such valve mechanisms are conventionally operated by a moving part of the motor or pump at the end of each stroke. Such valve mechanisms usually employ a resilient means to cause snap operation of the valve, and require that the slide valve be accurately fitted to its seat, and also usually require the use of a complicated mechanism to transmit the motion of the piston to the valve mechanism.

It is therefore a primary object of my invention to provide an improved valve mechanism for pneumatically operated reciprocating motors, in which no mechanical connection between the reciprocating parts of the motor and the valve mechanism is required.

A further object is to provide a valve mechanism of the above mentioned type, in which compensation is automatically made for changes in the pressure of the compressed air or power fluid utilized to operate the motor.

A further object is to provide an improved valve mechanism of the above described type, which is used in conjunction with a reciprocating motor operating a lubricant pump, and in which the operation of the valve mechanism is controlled in part by the lubricant pressure at the discharge of the lubricant pump.

Other objects will appear from the following description, reference being had to the accompanying drawings, in which:

Figs. 1 and 1a are a central vertical sectional view of the reciprocating motor, the valve mechanism for controlling the operation thereof and the pump operated thereby;

Fig. 2 is a plan view of the motor and valve mechanism shown in Fig. 1;

Fig. 3 is a fragmentary sectional view showing the mounting of the walking beam; and Fig. 4 is a fragmentary sectional view of the compensating piston stem and walking beam, taken on the plane of the line 4—4 of Fig. 3.

The pneumatically operated motor comprises a cylinder body 10 having heads 12 and 13 secured thereto by studs 14. A piston 16 secured to a piston rod 18 is reciprocable within the cylindrical bore 20 of the cylinder body 10. The rod 18 is the actuating rod for a reciprocating lubricant pump which may be of conventional construction, such as shown, for example, in the patents to Garancher No. 2,229,844 and Davis No. 2,060,180. The rod 18 extends through a packing assembly 17 in a pump head 19 which has a cylinder 21 secured thereto. The pump head is constructed for attachment to the top of a drum 23 of lubricant. An apertured piston 25, having a valve 27 associated therewith, is secured to the lower end of the rod 18. A suitable foot valve 29 is provided at the lower end of the cylinder 21. The pump has a suitable discharge conduit 31 connected thereto and is adapted to have its discharge controlled in the usual manner by a manually operated valve. The head 13 is provided with an undercut passageway 22 communicating with a passageway 24 formed in the cylinder body 10, and thus with suitable passageways 26 formed in the head 12 to form an air inlet and exhaust passageway for the rod end of the cylinder. The head 12 is provided with an exhaust passageway 28 and an air inlet passageway 30, both opening into the head end of the cylinder 20.

Air under pressure is supplied through a hose 32 (Fig. 2) to a central chamber 34 formed in a valve body 36 which is secured to the head 12 by cap screws 38 (Fig. 2). The chamber is provided with valve seats 40 and 41 for inlet valves 42 and 43 respectively, these valves being held against their seats by compressed coil springs 44 and 45 seated in suitable drilled recesses 46 formed in bushings 48 and 49 threaded in the valve body 36. The valves 42 and 43 are secured to valve stems 50 and 51 respectively, which are guided and sealed in bushings 52 and 53 respectively. The seals for these valve rods are preferably of the cup or V type, and may be made of a suitable synthetic rubberlike material.

Air passing through the valve seat 40 may flow through an elbow-shaped passageway 54 which communicates with the passageway 30 and thus with the head end of the cylinder bore 20. Similarly, the air flowing from chamber 34 through the valve seat 41 may enter an elbow-shaped passageway 55 which at its lower end communicates with passageway 26 and hence with the rod end of the cylindrical bore 20. The valve body 36 is provided with exhaust ports 58 and 59, the upper ends of which form seats for exhaust valves 60 and 61. These exhaust valves may be of the ball type and are normally held against their seats by the force of compression coil springs 62 and 63 acting upon piston-like members 64 and 65, which are reciprocable in suitable bores 66 and 67, fitting closely particularly in the reduced diameter end portions which are of substantially greater diameter than the exhaust ports 58, 59. The piston-like members 65 and 64 have relatively small diameter plungers 70 and 71 respectively secured thereto, these plungers being reciprocable in bores 72 and 73 formed in bushing fittings 74 and 75 which are threaded in the body 36. Formed integrally with the plungers 70, 71, are actuating rods 76 and 77 which are guided and sealed in bushings 79, these bushings being threaded in the fittings 74 and 75 respectively.

The cylinders 66 and 67 communicate with the atmosphere through exhaust ports 80 and 81, respectively. The upper end of the cylinder 72 communicates with the inlet passageway 30 through passageway 82, annular groove 84, and diagonal passageway 86. Similarly, the upper end of the cylinder 73 communicates with the inlet passageway 55 through passageway 83, annular groove 85, and diagonal passageway 87. The diameters of the bores of cylinders 72 and 73 are slightly less than the diameters of the seats for the exhaust valves 60 and 61.

A cylinder 88 has one end thereof communicating with chamber 34 through an annular groove 89 and passageways 90 and 91, and has a piston 92 reciprocable therein. The outer face of this piston bears against the lower end of a lever 94 which is pivoted to the valve body 36 by a pin 96, and the upper end of which has a toggle link 98 pivoted thereby by a pin 100. The toggle link has a wedge point end 102 which engages in notches 104 formed in a walking beam 106. The latter is channel shaped in cross section, and is pivotally secured to a bail 108 which, in turn, is pivotally mounted on a pair of pivot cap screws 110, 111 (Figs. 3 and 4), which are threaded in suitable bosses 112 forming part of the body 36. The bail 108 comprises two similar arms 114 and a cross piece 116. The side walls of the walking beam 106 are notched and pressed outwardly to provide ears 118 through which a pivot pin 120 extends. The ends of the pivot pin are provided with annular grooves 122 which are engaged by the notched ends of a pair of retaining leaf springs 124, the latter being secured in position by the pivot studs 110 and 111.

The cross piece 116 of the bail 106 rests upon a plunger 126 which is guided and sealed in a bushing 128 threaded in the upper end of the valve body 36, and projects into a chamber 127 which communicates with the discharge outlet of the lubricant pump through a passageway 129 and conduit 131 (Fig. 2).

A cap 130 has a cylindrical bore 132 for a piston 134, the piston having a stem 136 which is bifurcated to pass the pivot pin 120 and normally engages and rests upon the cross piece 116 of the bail 108. The cap 130 is secured to the valve body 36 by a plurality of cap screws 138 and is provided with a passageway 140 terminating in an opening 142 at the upper end of cylinder 132. The lower end of passageway 140 communicates with the central air pressure chamber 34 through a duct 144 (Fig. 2).

The valve stems 50 and 51 are provided with heads 150 which are slidable in complementary bores in the bushings 52 and 53. The upper portions of these valve stems 50 and 51 are drilled to provide passageways 152, the lower ends of which communicate with the passageways 30 and 55, respectively, and the upper ends of which form seats for ball valves 154 and 155. These valves may be held against their seats by headed plungers 158 and 159 which are guided in the bushings 52 and 53 respectively. These bushings are provided with vent passageways 160 and 161 respectively.

Assuming that the chamber 34 is at atmospheric pressure and a valve (not shown) in the compressed air supply conduit 32 is opened to admit air under pressure to the chamber 34, the valves 42 and 43 will be in closed position and will have raised the walking beam 106 to a horizontal position with the pivot 120 thereof somewhat above the position in which it is shown in Fig. 1. However, immediately after admission of air under pressure to the chamber 34, air flowing into cylinder 132 will force the piston 134 downwardly, thus moving the pivot 120 downwardly. Air under pressure will also be admitted to the cylinder 88 and the piston will thereafter apply a force to the toggle 98 which is proportional to the air pressure. Also, the exhaust valves 60 and 61 will be held against their seats due to the air pressure in their cylinders 72 and 73, as well as due to the force applied to them by their springs 62 and 63. However, as air under pressure is supplied to the cylinder 132 the piston 134 will be moved downwardly, forcing the cross piece 116 and pivot pin 120 downwardly.

As the walking beam 106 is thereby moved downwardly it assumes an unstable position due to the effect of the air pressed toggle link 98, and it will tilt in one direction or the other, it being immaterial in which direction it tilts. Assuming that it tilts counterclockwise to the position in which it is shown in Fig. 1, the toggle link will engage plunger 158 and press it downwardly to open the inlet valve 42, (holding the ball valve 154 against its seat), whereupon air under pressure will flow through the passageways 34 and 30 to the upper end of the cylinder 20. As a result, the piston 16 and lubricant pump plunger 18 will move downwardly. The pressure in the lower end of cylinder 20 will build up until it attains a value sufficient to open exhaust valve 61, which is held against its seat only by the force of the spring 63, whereupon the air from the lower end of the cylinder 20 will flow through the passageways 22, 24, 26, and past the exhaust valve 61 to the vent port 81.

As soon as this exhaust valve 61 opens, the entire area of the piston 65 is subjected to the exhaust air pressure and the exhaust valve therefore remains open despite the rapid decrease in the pressure of the air at the exhaust port 59. It will be understood that the exhaust valve 61, rather than exhaust valve 60, will open because the exhaust valve 60 tends to be held closed not only by forces similar to those which hold the exhaust valve 61 closed, but in addition the plunger 70 is pressed downwardly due to the air pressure on its upper end and due to the action of the toggle link 98 upon the walking beam 106 pressing the stem 76 downwardly. The walking beam also tends to be held in the position shown by the air pressure and the force of the spring 45 on the closed valve 43, acting through its stem 51 and plunger 159, against the walking beam. It will also be noted that the upper end of cylinder 73 is vented to the atmosphere through passageway 83, annular groove 85, diagonal passageway 87, passageway 152 in stem 51, and vent passageway 161. The ball valve 155 is free to move from its seat, being held thereon only by the weight of plunger 159.

When the piston 16 reaches the lower end of its stroke, the pressure in the lower end of the cylinder 22, and hence the pressure acting upon the valve 61, will drop (due to bleeding of air through passageway 161, etc., and due to the fact that the member 65 does not fit too closely in the reduced diameter portion of the bore 67), and the exhaust valve 61 will again be moved to its closed position by its spring 63. As pressure in the upper end of the cylinder 20 builds up substantially to the pressure at which the air is supplied, the exhaust valve 60 will be subjected to sufficient pressure to cause it to leave its seat, whereupon the entire area of the piston 64 will be subjected to pressure and exert a sufficient upwardly directed force upon the stem 76 to cause the walking beam to tilt in the opposite direction (clockwise), such tilting action being effected by a snap action due to the force applied to the walking beam by the toggle link 98.

Such tilting of the walking beam 106 in the opposite direction results in opening the inlet valve 43 and permitting the inlet valve 42 to close. Thus, air under pressure is supplied through passageways 55, 26, 24, and 22, to the lower end of the cylinder 20, and causes the piston 16 to commence moving upwardly, the exhaust valve 60 being opened as the back pressure builds up in the upper end of cylinder 20. Since lower pressure is required to maintain valve 60 open than to open it, air may escape from the upper end of the cylinder rather freely through the passageway 28, past the exhaust valve 60 and through the exhaust port 80 to the atmosphere. Some air may also bleed to the atmosphere through passageways 30, 54 the passageway 152 in stem 50 and vent port 160, thereby also reducing the pressure on plunger 70. The upward motion of the piston 16 will continue until it reaches the upper end of its stroke, whereupon the pressure in the upper end of the cylinder 20 will drop, permitting the exhaust valve 60 to close, and thus removing one of the forces tending to maintain the walking beam in the position opposite to that in which it is shown in Fig. 1. The pressure in the lower end of the cylinder 20 will therefore build up to substantially the pressure at which the air is supplied, and this pressure will be exerted against the exhaust valve 61 to cause the latter to snap to open position and thereby again tilt the walking beam 106 to the position shown in Fig. 1.

If at any time during either the upward or the downward stroke of the piston 16, it is arrested due to the fact that the back pressure of lubricant against the piston rod 18 applies a force sufficient to resist that of the air pressure applied to the piston 16, there would be a tendency for the walking beam to chatter, that is, to move back and forth between its two extreme positions in rapid succession. This difficulty is avoided in the construction shown herein by providing the plunger 126, which, it will be recalled, has its chamber 127 connected to the outlet of the lubricant pump and is therefore subjected to the lubricant pressure. As this pressure builds up to a value which would tend to cause such chattering action of the walking beam and associated parts, the plunger 126 is forced upwardly against the force applied by the air pressure compensating piston 134, raising the pivot 120, and hence the center of the walking beam 106, against the air pressure within the cylinder 132, and thus permitting both inlet valves 42 and 43 to close. The parts will thus remain static until the pressure of the lubricant drops sufficiently, whereupon the air pressure within the cylinder 132 will force the piston 134, and hence the pivot 120, downwardly to the position in which these parts are shown in Fig. 1, and thus recondition the mechanism for operation as previously described.

From the foregoing, it will be clear that the valve mechanism will operate alternately to admit air under pressure to one end of the cylinder 20, while permitting exhaust of air from the other side thereof, automatically, without there being any mechaniscal connection between the piston 16 and the valve mechanism. Since the force applied to the toggle link 98 varies with changes in the pressure of the power fluid supplied, compensation is automatically made for such variations in air pressure, so that close regulation of the pressure of the power fluid, such as compressed air, is not required. All of the valve return springs used in the mechanism are relatively weak and the forces applied thereby do not constitute important or controlling factors in the operation of the valve mechanism.

Since the valve mechanism is a unit having no mechanical connection with the remaining portions of the motor, the mechanism may readily be applied to control the operation of a variety of types and sizes of reciprocating fluid operated motors, and may readily be replaced if for any reason it should become damaged or otherwise unserviceable.

By having the valve mechanism controlled in part by the pressure of the lubricant discharged from the lubricant pump operated by the reciprocating motor, the necessity for using other controls to shut off the supply of air pressure when the lubricant pressure attains its desired maximum value, is avoided. Due to the fact that such auxiliary pressure operated control valves or lubricant pressure responsive switch mechanisms or solenoid operated valves in the air supply line are not required, the cost of the lubricating equipment as a whole is substantially reduced.

Furthermore, it will be apparent from the foregoing description and drawings that while the valve mechanism includes a number of parts, none need be constructed with a particularly high degree of accuracy, and most of the parts may be made on an automatic screw machine at low production costs.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A reciprocating fluid pressure operated motor comprising a cylinder, a piston reciprocable therein, and valve mechanism operable alternately to supply power fluid under pressure from a source to opposite ends of the cylinder while exhausting the other end of the cylinder, comprising, means forming a pair of exhaust passageways connected to the opposite ends of the motor cylinders respectively, a pair of exhaust valves for controlling the discharge of the power fluid through said passageways respectively, said exhaust valves being of the poppet valve type requiring a substantially higher pressure to unseat them than is required to maintain them unseated, means forming inlet passageways connecting the source to the ends of the cylinder respectively, a pair of inlet valves in the inlet passageways for respectively controlling the flow of pressure fluid through the inlet passageways to the opposite ends of the motor cylinder, a two-position beam operated by the exhaust valves alternately to open the inlet valve leading to one end of the cylinder while opening the exhaust valve connected to the other end of the cylinder, and means operated by the pressure of the source to apply to the beam a force tending to hold it in either of its two positions.

2. A reciprocating fluid pressure operated motor comprising a cylinder, a piston reciprocable therein, a lubricant pump connected to the piston for operation thereby, and valve mechanism operable alternately to supply power fluid under pressure from a source to opposite ends of the cylinder while exhausting the other end of the cylinder, comprising a pair of exhaust valves for the discharge of the power fluid respectively from the ends of the cylinder, said exhaust valves being of the poppet valve type requiring a substantially higher pressure to unseat them than is required to maintain them unseated, a pair of inlet valves for respectively admitting pressure fluid to the opposite ends of the motor cylinder, a member movable to either of two operative positions and operated by the exhaust valves alternately to open the inlet valve leading to one end of the cylinder while opening the exhaust valve connected to the other end of the cylinder, and means responsive jointly to the pressure of the source and the pressure of the lubricant supplied by the lubricant pump to render said member ineffective whenever the lubricant pressure exceeds the pressure of the source by more than a predetermined ratio.

3. A reciprocating fluid pressure operated motor connected to a reciprocating lubricant pump, comprising a cylinder, a piston reciprocable therein, and valve mechanism operable alternately to supply power fluid under pressure from a source to opposite ends of the cylinder while exhausting the other end of the cylinder, comprising, means forming passageways and a pair of exhaust valves for the discharge of the power fluid respectively from the ends of the cylinder, said exhaust valves being of the poppet valve type requiring a substantially higher pressure to unseat them than is required to maintain them unseated, means forming passageways and a pair of inlet valves for respectively admitting pressure fluid to the opposite ends of the motor cylinder, an element having two operative positions and actuated by the exhaust valves alternately to open the inlet valve leading to one end of the cylinder while opening the exhaust valve connected to the other end of the cylinder, yieldable means to apply to the element a force tending to hold it in either of its two operative positions, and means responsive to the pressure of the lubricant discharged by the pump to render said element ineffective to operate either of the inlet valves whenever the lubricant pressure exceeds the pressure of the source by more than a predetermined ratio.

4. A reciprocating motor operable by fluid pressure derived from a source thereof, having a cylinder, a piston reciprocable therein, and valve mechanism operable alternately to supply the power fluid under pressure from the source while exhausting the other end of the cylinder to the atmosphere, comprising: exhaust passageways leading from the opposite ends of the cylinder to the atmosphere, exhaust valves in said passageways respectively, said exhaust valves being of the poppet type requiring a substantially higher pressure to unseat them than is required to maintain them unseated, plungers respectively connected to the exhaust valves, cylinders for the plungers, a pair of inlet passageways connecting the source of the opposite ends of the motor cylinder, a pair of inlet valves respectively controlling the flow of pressure fluid through the inlet passageways, passageways respectively connecting the portions of said inlet passageways at the outlet side of the inlet valves to the plunger cylinders of the exhaust valves associated with the end of the motor cylinder to which the respective portion of the inlet passageway connects, a pivoted beam operated by the exhaust valves alternately to open the inlet valve leading to one end of the motor cylinder while opening the exhaust valve connected to the other end of the motor cylinder, and fluid pressure operated means to hold the pivoted beam in operative position.

5. A reciprocating fluid pressure operated motor comprising a cylinder, a piston reciprocable therein, and a valve mechanism operable alternately to supply power fluid under pressure to opposite ends of the cylinder while exhausting the other end of the cylinder, comprising, a pair of exhaust valves for the discharge of the power fluid respectively from the opposite ends of the cylinder, said exhaust valves being of the poppet valve type requiring a substantially higher pressure to unseat them than is required to maintain them unseated, each of said exhaust valves having a plunger operatively connected thereto, means forming cylinders for the exhaust valve plungers, a pair of inlet valves and ducts connected thereto for respectively admitting pressure fluid to the ends of the motor cylinder and to the cylinder of whichever exhaust valve is operable to exhaust the end of the motor cylinder to which the pressure fluid is being supplied, and a pivoted beam operated by the exhaust valves alternately to open the inlet valve leading to one end of the cylinder while opening the exhaust valve connected to the other end of the cylinder.

6. A reciprocating fluid pressure operated motor comprising a cylinder, a piston reciprocable therein, and valve mechanism operable alternately to connect a source of power fluid under pressure to opposite ends of the cylinder while exhausting the other end of the cylinder, comprising, exhaust passageways and a pair of exhaust valves therein operatively interposed between the respective ends of the motor cylinder and atmosphere for the discharge of the power fluid respectively from the ends of the cylinder, said exhaust valves being of the poppet valve type requiring a substantially higher pressure to unseat them than is required to maintain them unseated, a pair of inlet valves for respectively admitting pressure fluid to the opposite ends of the motor cylinder, a two-position pivoted beam operated by the exhaust valves alternately to open the inlet valve leading to one end of the cylinder while opening the exhaust valve connected to the other end of the cylinder, and a yielding means applying a force to the beam to hold it in either of its two positions.

7. A reciprocating fluid pressure operated motor comprising a cylinder, a piston reciprocable therein, and valve mechanism operable alternately to supply power fluid under pressure from a source to opposite ends of the cylinder while exhausting the other end of the cylinder, comprising, means forming a pair of short exhaust passageways, a pair of exhaust valves controlling the discharge of the power fluid respectively from the ends of the cylinder through said passageways, said exhaust valves being of the poppet valve type requiring a substantially higher pressure to unseat them than is required to maintain them unseated, a pair of inlet valves for respectively admitting pressure fluid to the opposite ends of the motor cylinder, duct means connected respectively between each of the inlet valves and one of the opposite ends of the cylinder, an element having two operative positions and actuated by the exhaust valves alternately to open the inlet valve leading to one end of the cylinder while opening the exhaust valve connected to the other end of the cylinder, and yieldable means to apply to the element a force tending to hold it in either of its two positions, all of said valves having actuating stems and said element comprising a pivoted lever engageable with the ends of the stems.

8. A reciprocating fluid pressure operated motor comprising a power cylinder, a piston reciprocable therein, a lubricant pump connected to the piston for operation thereby, and valve mechanism operable alternately to supply power fluid under pressure from a source to opposite ends of the cylinder while exhausting the other end of the cylinder, comprising a pair of exhaust passageways between the respective ends of the power cylinder and atmosphere and having exhaust valves therein for the discharge of the power fluid respectively from the ends of the cylinder, said exhaust valves being of the poppet valve type requiring a substantially higher pressure to unseat them than is required to maintain them unseated, fluid pressure operated means to hold each of said valves in closed position, a pair of inlet valves and duct means connected thereto for respectively admitting pressure fluid to the opposite ends of the motor cylinder and to the fluid pressure operated means associated with the exhaust valve which is to be held closed, a member movable to either of two operative positions and operated by the exhaust valves alternately to open the inlet valve connected to one end of the cylinder while cutting off the supply of pressure fluid to the fluid pressure operated means associated with the exhaust valve connected to the other end of the cylinder, means responsive to the pressure of the lubricant supplied by the lubricant pump to render said member ineffective whenever the lubricant pressure exceeds the pressure of the source by more than a predetermined ratio, and detent means connected to the source and normally applying to said member a force proportional to the pressure of the source, to hold the member in either of its operative positions.

9. A reciprocating fluid pressure operated motor comprising a cylinder, a piston reciprocable therein, and valve mechanism operable alternately to supply power fluid under pressure from a source to opposite ends of the cylinder while exhausting the other end of the cylinder, comprising, exhaust passageways and a pair of exhaust valves therein for the discharge of the power fluid respectively from the ends of the cylinder to the atmosphere, said exhaust valves being of the poppet valve type requiring a substantially higher pressure to unseat them than is required to maintain them unseated, plungers connected to the exhaust valves respectively and normally subjected to the pressure of the fluid pressure source, a pair of inlet valves and ducts connected thereto for respectively admitting pressure fluid to the opposite ends of the motor cylinder, a pivoted beam operated by the exhaust valves alternately to open one inlet valve to admit pressure fluid to one end of the cylinder while opening the exhaust valve connected to the other end of the cylinder and then the other inlet valve and the opposite exhaust valve, fluid pressure operated means to hold the pivoted beam in operative position, and means including openings to the atmosphere to relieve the pressure on each of the exhaust valve plungers when its associated inlet valve is closed.

10. In a fluid pressure operated reciprocating lubricant pump comprising a motor cylinder and a piston reciprocable therein and a pumping element linked to and driven by the piston, the improvement which includes a valve assembly fastened to the motor cylinder and communicating therewith to control the flow of pressure fluid to and from the motor cylinder, said valve assembly including a pair of inlet valves and ducts connected thereto to admit pressure fluid alternately to opposite ends of the motor cylinder, a pair of exhaust valves and ducts connected thereto alternately to vent opposite ends of the motor cylinder to atmosphere, a member oscillatable into two alternative positions and movable toward and away from an operative position, means linking all of said valves to said member whereby each inlet valve admitting pressure fluid to one end of the motor cylinder will open in paired relationship to the opening of an exhaust valve venting pressure fluid from the opposite end of the motor cylinder, means for oscillating said member, a snap action device connected with said member tending to hold it in one or the other of its two alternative oscillatable positions, means urging said member to operative position, and means responsive to lubricant pressure to move said member away from operative position whereby the valve mechanism ceases to operate when the lubricant pressure exceeds a predetermined value.

References Cited in the file of this patent
UNITED STATES PATENTS

| 8,036 | Adams | Jan. 8, 1878 |
| 2,103,965 | Wineman | Dec. 28, 1937 |
| 2,177,828 | Huck | Oct. 31, 1939 |